United States Patent
Sasaki et al.

(10) Patent No.: US 6,349,470 B1
(45) Date of Patent: Feb. 26, 2002

(54) RETAINING METHOD FOR SPHERICAL BEARING

(75) Inventors: Gen Sasaki; Shinichi Akao; Kennosuke Kariya, all of Kitasaku-gun (JP)

(73) Assignee: Minebea Co., Ltd., Kitasaku (JP)

( * ) Notice: Subject to any disclaimer, the term of this patent is extended or adjusted under 35 U.S.C. 154(b) by 0 days.

(21) Appl. No.: 09/604,421

(22) Filed: Jun. 27, 2000

(30) Foreign Application Priority Data

Jan. 5, 2000 (JP) ........................................ 2000-000351

(51) Int. Cl.[7] .............................................. B21D 53/10
(52) U.S. Cl. ...................... 29/898.62; 384/208; 384/210
(58) Field of Search ............................... 29/898, 898.07, 29/898.09, 898.062, 724; 384/206, 208, 901, 207, 210, 192

(56) References Cited

U.S. PATENT DOCUMENTS

| 3,014,767 A | | 12/1961 | Thrasher et al. | |
| 3,754,802 A | * | 8/1973 | Keller | 308/72 |
| 3,947,077 A | | 3/1976 | Berg et al. | |
| 4,355,250 A | * | 10/1982 | Langdon | 310/88 |
| 4,716,327 A | * | 12/1987 | Stone | 310/90 |
| 4,806,025 A | * | 2/1989 | Kamiyama et al. | 384/202 |
| 4,887,916 A | * | 12/1989 | Adam et al. | 384/192 |
| 5,113,104 A | * | 5/1992 | Blaettner et al. | 310/90 |
| 5,358,342 A | * | 10/1994 | Frisbee et al. | 384/213 |
| 5,483,756 A | * | 1/1996 | Heyder | 34/601 |
| 5,718,517 A | | 1/1998 | Morando | |
| 5,945,756 A | * | 8/1999 | Periyathamby et al. | 310/89 |

FOREIGN PATENT DOCUMENTS

| DE | 41 12 791 C1 | 7/1992 |
| EP | 0 962 676 A2 | 8/1999 |
| JP | 01 126430 | 5/1989 |

* cited by examiner

Primary Examiner—David P. Bryant
Assistant Examiner—Marc W. Butler
(74) Attorney, Agent, or Firm—Oliff & Berridge, PLC

(57) ABSTRACT

On the periphery surface of the outer race, the stepped portion is formed, and on one side of the race retention hole formed on the housing, a screw portion is provided coaxially with the race retention hole, in which the setscrew is screwed and tightened. Retention of the front surface of the setscrew makes the end face of the stepped portion, pressed against the snap ring retained with the annular groove, formed on the race retention hole. Since the outer race is clamped by the setscrew and the snap ring and the gap between the end face of the outer race and the setscrew, and the snap ring becomes null, the outer race is securely retained in the axial direction.

3 Claims, 12 Drawing Sheets

RETAINING METHOD FOR SPHERICAL BEARING

BACKGROUND OF THE INVENTION

1. Field of the Invention

This invention relates to a retaining method for a spherical bearing, in particular, retaining an outer race on the portion to be retained.

2. Related Art

In general, in the spherical bearing, as shown in FIG. 10, it is constituted in such a manner as an inner race 51 having a sphere is made to be supported by an outer race 52 rotatably and slidably, the outer race 52 is made to be retained with a race retention 54 formed on a housing 53, snap rings 56 are made to be retained respectively with annular grooves 55 formed on the race hole 54 at a given spacing and the outer race 52 is retained with a housing 53 by making an end face 52a of the outer race 52 to be engaged with a pair of snap rings 56.

However, a pair of annular retaining grooves 55 to be retained with the snap rings 56 are formed by a machinery working on a wall face 54a of the race retention hole 54 and since, from an assembling view point, a clearance of the spacing of a pair of annular grooves 55 are set in plus, in such spherical bearing 57 as being mounted on the housing 53, as shown in FIG. 11, a gap is generated between the snap ring 56 and the end face 52a of the outer race 52 and due to an axial load entering the outer race 52, it has happened to be displaced between a pair of snap rings 56. And, in the case where such spherical bearing 57 is used in a steering drive system of the vehicle, the end face 52a of the outer race 52 is apt to hit the end face 56a of the snap ring 56 and the vibration generated is transmitted to the cavity of the vehicle through a frame to generate an unpleasant noise.

So that, as shown in FIG. 12, although it has been conventionally known, so-called, as a staking method for a retaining method, in which, at the opening of the race retention hole 54, chamfer portions 58 are formed and the peripheral surfaces 52b of the outer race 52 are formed with hook portions 59 to engage with the chamfers 58 for preventing the outer race from being displaced due to the axial load, a tight retention has been secured but on the other hand, processing of parts has been complicated to increase manufacturing cost.

SUMMARY OF THE INVENTION

The present invention has been made in the light of the above circumstance, and the object thereof is to provide a secure retention method for an outer race of a spherical bearing while controlling manufacturing cost.

In order to attain the above object, according to a first aspect of the present invention, in a retention method of a spherical bearing At consisting of an outer race and an inner race the spherical surface of which is supported on the outer race rotatably and slidably, in which the spherical bearing is retained with a race retention hole formed on a portion to be retained, on one side of an inner wall surface of the race retention hole of the portion to be retained a screw portion having a given stroke is formed coaxially with the race retention hole, on other side of the inner wall surface of the race retention hole an annular groove to be retained with a snap ring is formed, on one side of the periphery of the outer race a stepped portion having a diameter smaller than the diameter of the periphery is formed, in the state where the outer race of the spherical bearing is retained with the race retention hole a first snap ring is retained with the annular groove, and in the screw portion a setscrew formed with a through hole in an axial direction is screwed, tightened and pressured an end face of the stepped portion by a end face of the setscrew toward the first snap ring, thereby the first snap ring and the setscrew clamp the outer race to retain the spherical bearing to the portion to be retained.

Being structured as such, by retaining the first snap ring with the other side of the inner wall surface of the race retention hole, screwing and tightening the setscrew in the screw portion formed on the one side of the inner wall surface of the race retention hole, the end face of the setscrew pressures the end face of the stepped portion of the outer race toward the first snap ring, thereby the outer race is clamped by the setscrew and the first snap ring to retain the outer race on the portion to be retained.

According to a second aspect of the present invention, on the inner wall surface of the through hole of the setscrew, an annular groove is formed to be retained with a second snap ring.

Being structured as such, by abutting the end face of the second snap ring to the end face of the outer race, the outer race is retained on the portion to be retained more securely, further, by employing a high tensile spring as the second snap ring, a contact surface pressure between the setscrew and the screw portion is increased to prevent the setscrew from being loosened.

According to a third aspect of the present invention, on the U inner wall of the through hole of the setscrew an abutting portion to abut to one end face of the outer race is provided.

Being structured as such, by abutting the abutting portion formed on the setscrew to the end face of the outer race, the displacement of the outer race in axial direction is limited and can omit the second snap ring in the second aspect to reduce the number of the parts and the assembling processes.

DETAILED DESCRIPTION OF PREFERRED EMBODIMENT

Figure 1:
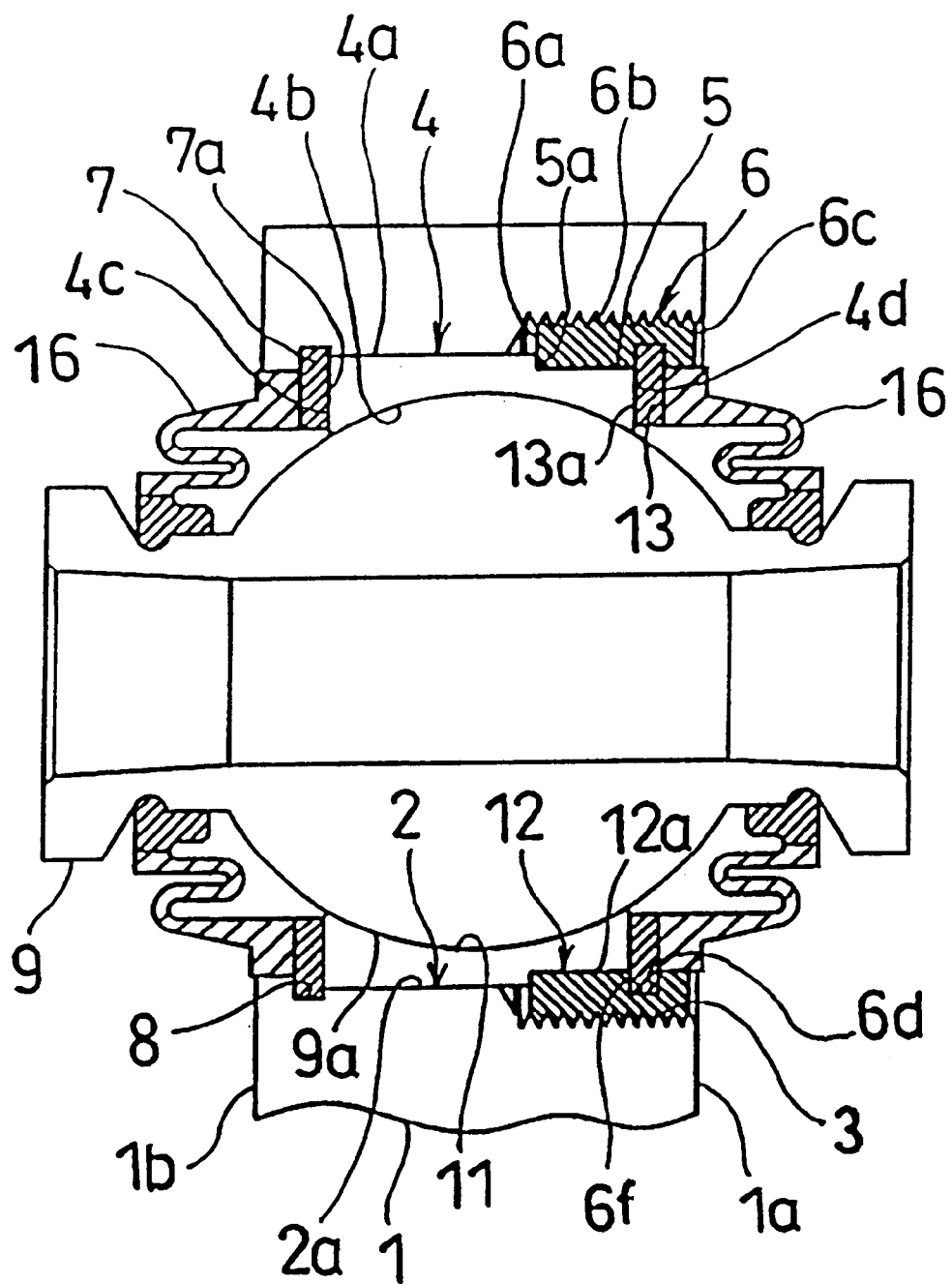
FIG. 1 is a sectional view for explanation of one embodiment of the spherical bearing of the present invention.

A retention method of a spherical bearing in one embodiment of the present invention is explained based on FIGS. 1–8. First, an outline of the retention method of the spherical bearing in one embodiment is explained. The retention method of the spherical bearing of the embodiment of the present invention, as shown in FIG. 1, on one side of an inner wall surface 2a of a race retention hole 2 facing to one end face 1a of housing 1 as a portion to be retained a screw portion 3 is provided coaxially with the race retention hole 2, on a periphery 4a of an outer race 4a stepped portion 5 having a diameter smaller than the one of the periphery 4a is formed, and by screwing a setscrew 6 formed in an approximately ring shape into the screw portion 3 and being tightened, a front end face 6a of the setscrew 6 presses the end face 5a of the stepped portion 5 of the outer race 4. Further, on the other side of the inner wall surface 2a of the race retention hole 2, an annular groove 8 is formed, by retaining a first snap ring 7 with the annular groove 8, the outer race 4 is clamped between the setscrew 6 and the first snap ring 7 and the outer race 4 is retained on the housing 1 as a portion to be retained.

Figure 3:
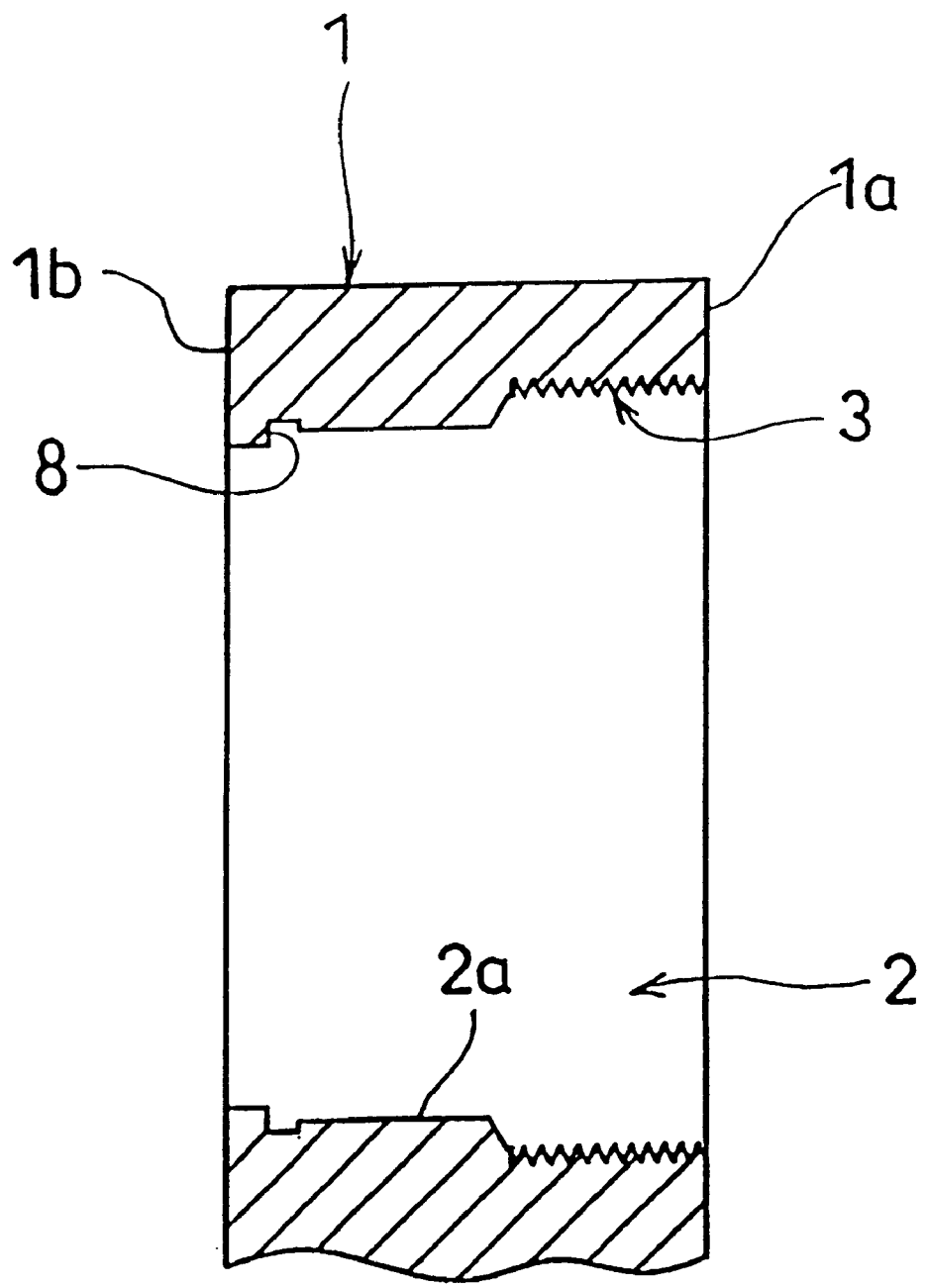
FIG. 3 is a sectional view of a housing of the embodiment of the spherical bearing of the present invention.

Next, a detailed constitution of the embodiment of the spherical bearing of the present invention will be explained. First, a housing 1 as the portion to be retained is explained. The housing 1 is formed with a pair of end faces 1a and 1b in parallel with each other and perpendicular to an axis (hereinafter referred to as merely "axis") of the not shown shaft to be supported (see FIGS. 1 and 3), and the race retention hole 2 with which the periphery 4a of the outer race 4 is retained in an ordinary manner is provided coaxially with the axis. Further, as shown in FIGS. 1 and 3, on one side of the race retention hole 2, the screw portion 3 having a diameter larger than the race retention hole 2 is formed, and on the other side of the race retention hole 2 and on the inner wall surface 2a of the race retention hole 2 the annular groove 8 in which the first snap ring 7 is retained is provided.

Figure 4:
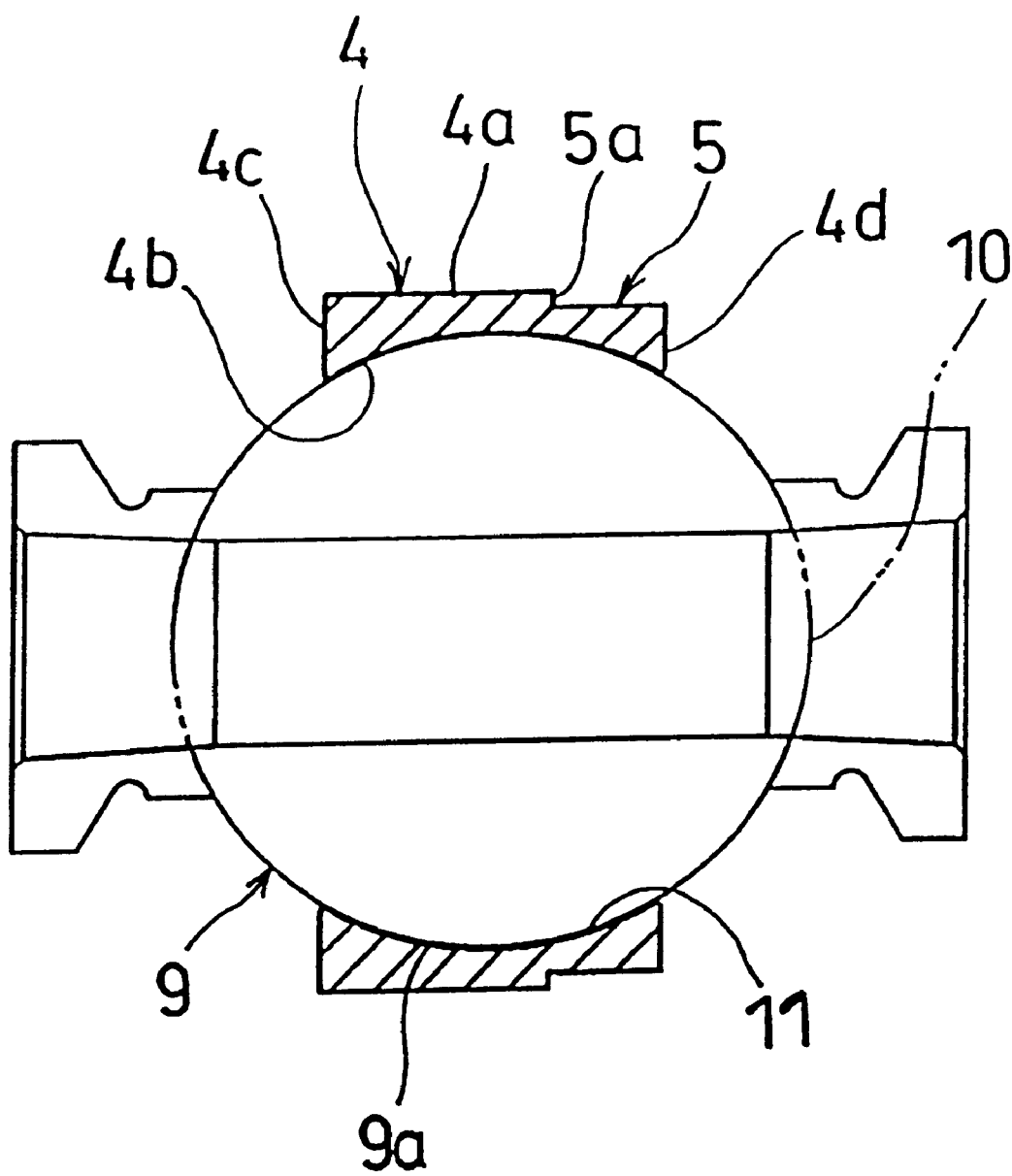
FIG. 4 is a sectional view of an assembly formed by retaining an inner race with an outer race of the spherical bearing of the present invention.

Next, the outer race 4 is explained. The outer race 4 is formed, as shown in FIG. 4, approximately cylindrical in such a manner as the shape of an inner circumferential surface 4b in a sectional surface including the axis becomes a circle, which is positioned on the circle 10 having diameter identical with the one of a spherical portion 9a formed on the inner race 9, and by retaining the spherical portion 9a of the inner race 9 with the inner circumferential surface 4b, it supports the inner race 9 rotatably and slidably. Further, the outer race 4 is provided with a stepped portion 5 on the peripheral surface 4a (see Figs. 1 and 4), and on the circumferential surface 4b, a liner 11 of a wearing resistance such as polytetrafluoroethylene is covered.

Figure 5:
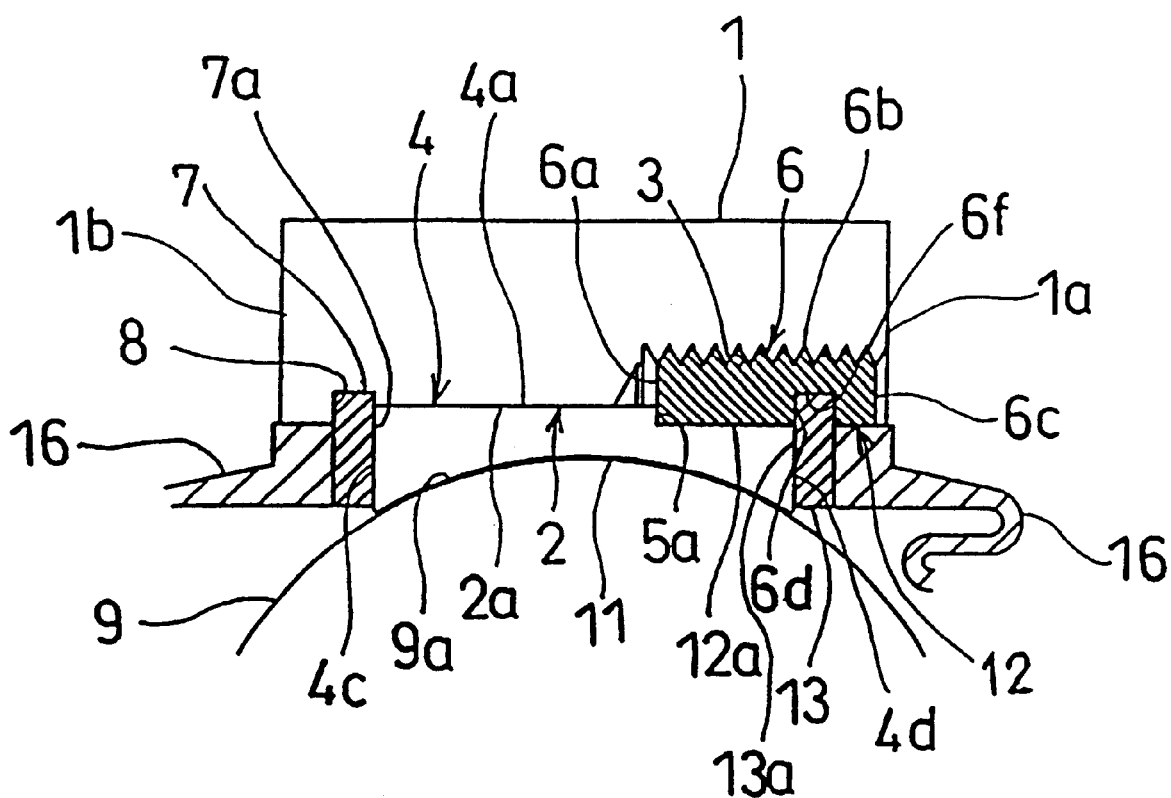
FIG. 5 is an explanation view of partially enlarged and sectional view of the embodiment of the spherical bearing of the present invention.
Figure 6A:
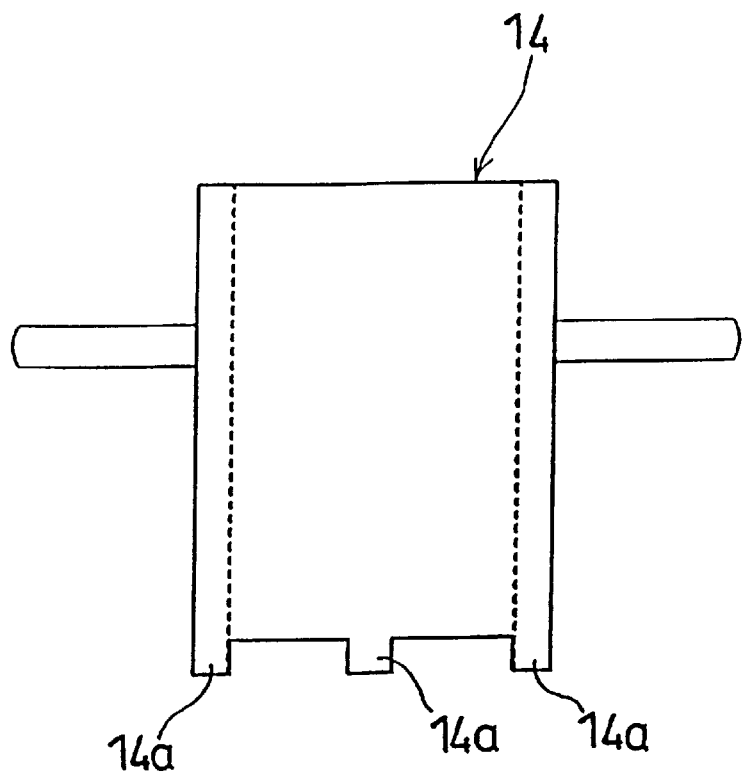
FIG. 6A is a front view for explaining a tightening jig for the setscrew of the embodiment of the spherical bearing of the present invention.
Figure 6B:
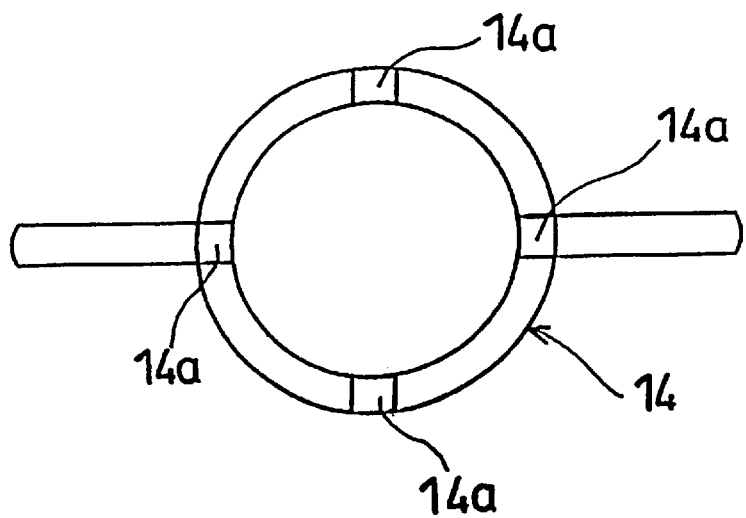
FIG. 6B is a plan view for explaining a tightening jig for the setscrew of the embodiment of the spherical bearing of the present invention.
Figure 8:
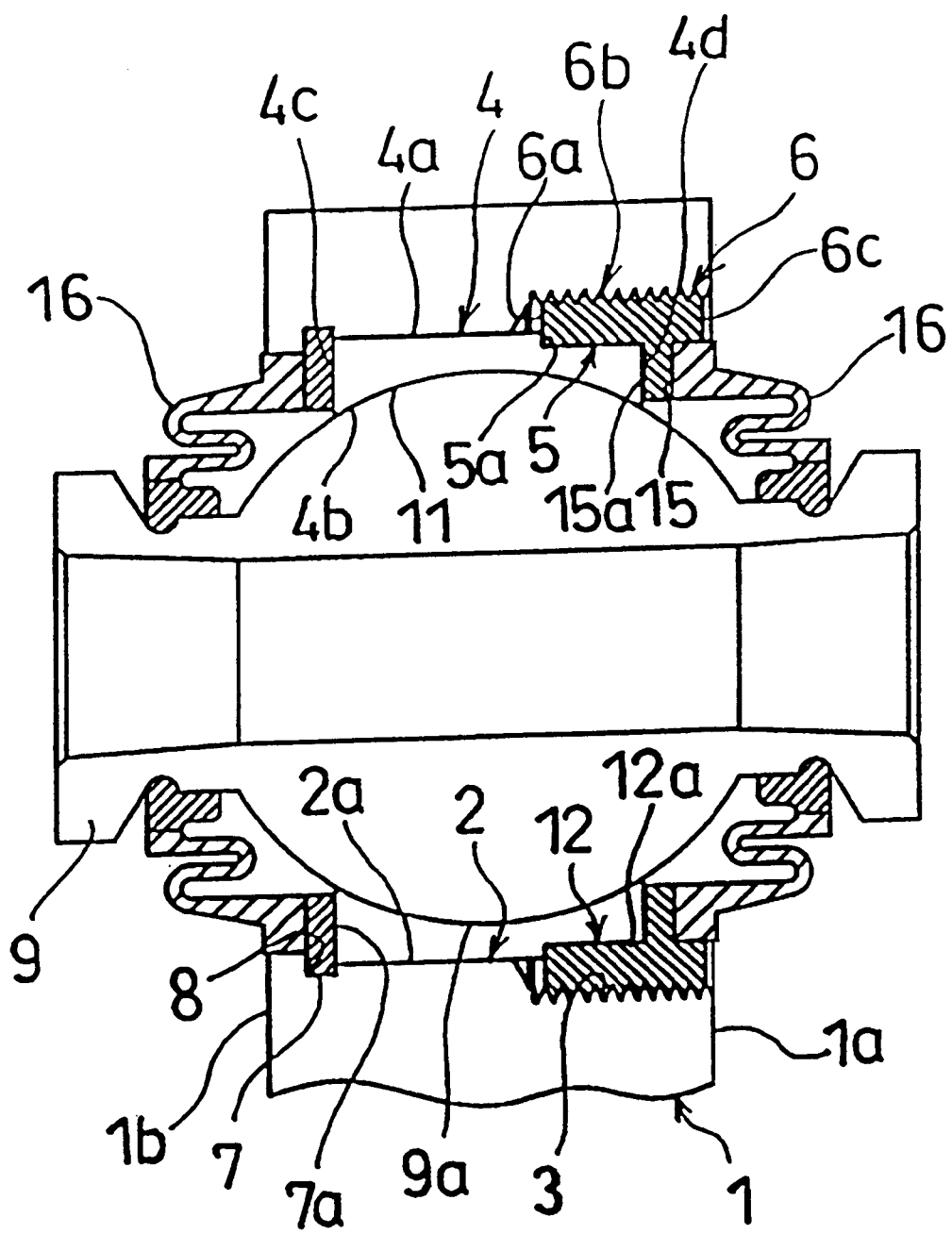
FIG. 8 is an explanation view for a case where, in the embodiment of the spherical bearing, the setscrew which is provided with an annular projection as an abutting portion on the inner wall surface of the through hole is used.
Figure 9:
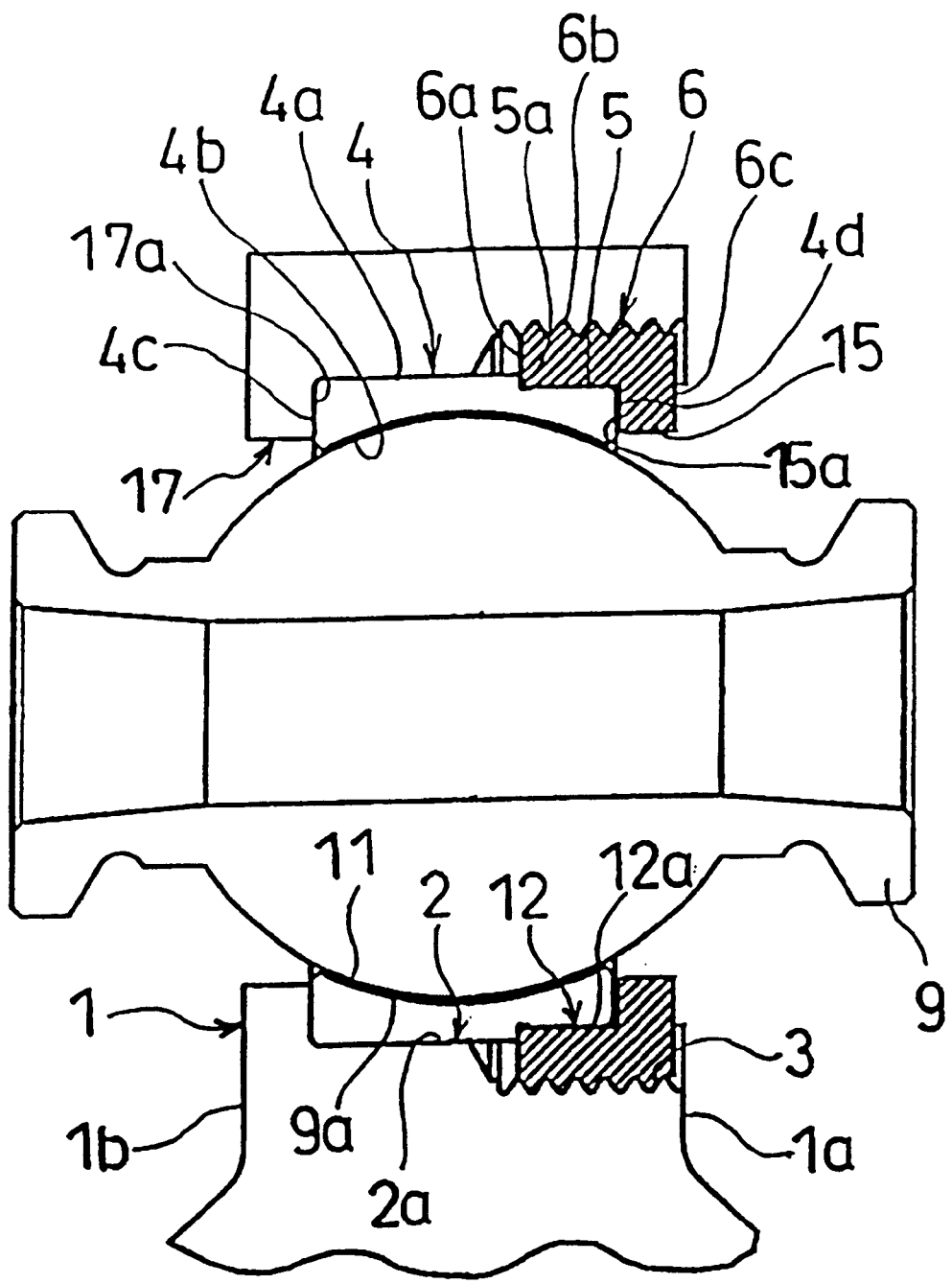
FIG. 9 is an explanation view for a case where, in the spherical bearing of the embodiment of the present invention, without using a snap ring an end face of the outer race is positioned.
Figure 10:
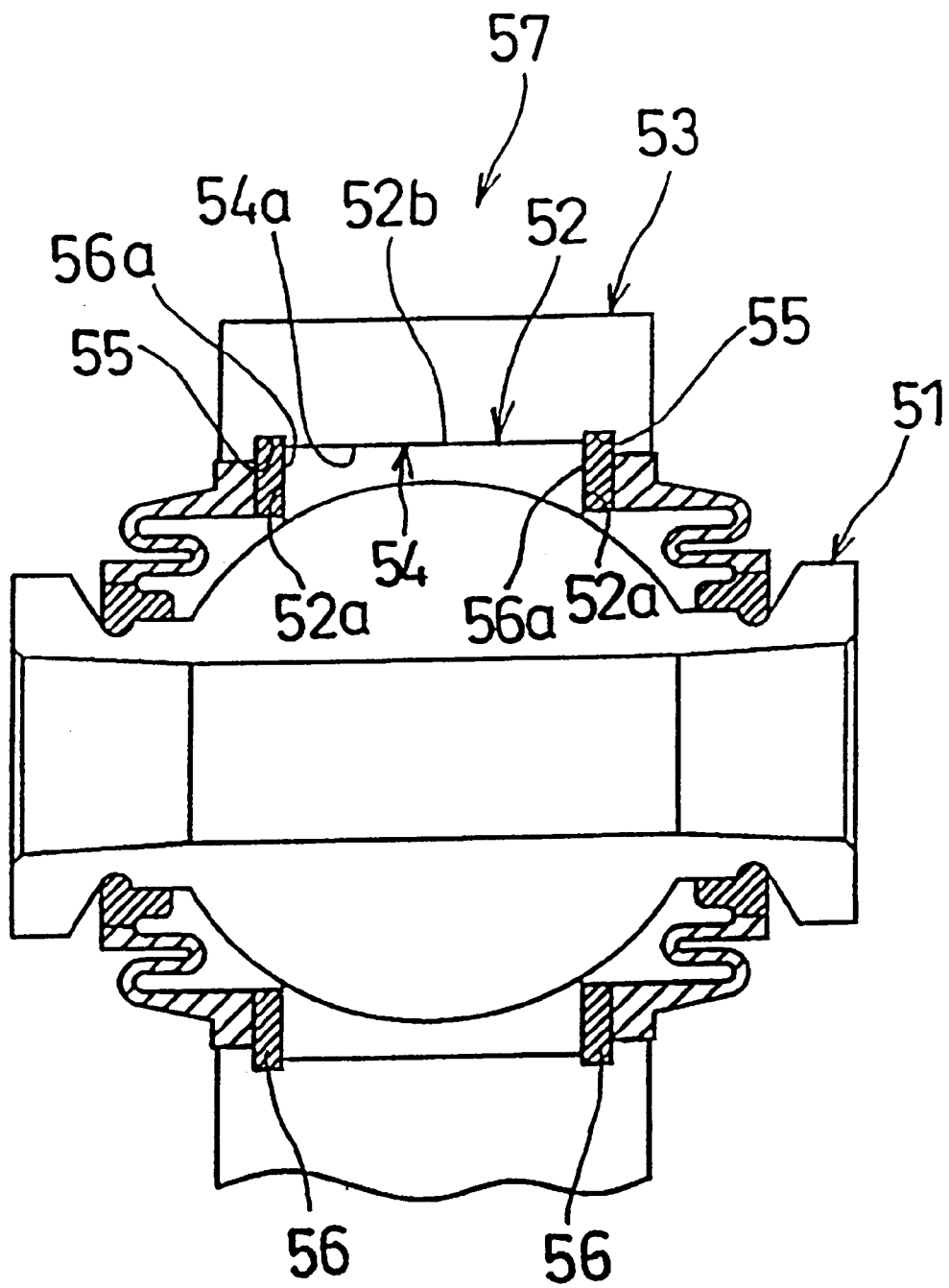
FIG. 10 is a sectional view of a conventional spherical bearing.
Figure 11:
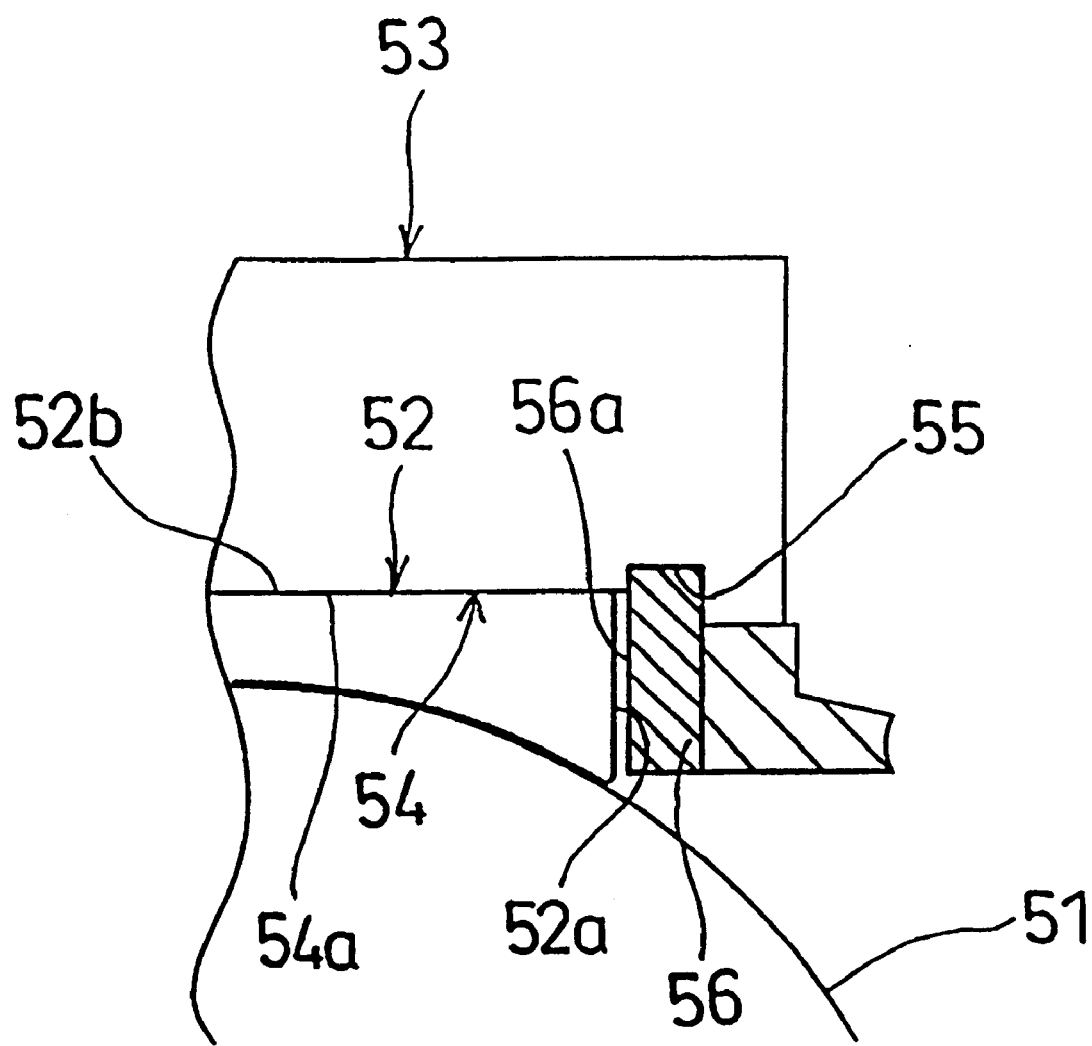
FIG. 11 is an explanation view showing a gap between the end faces of the outer race and of the snap ring in the conventional spherical bearing.
Figure 12:
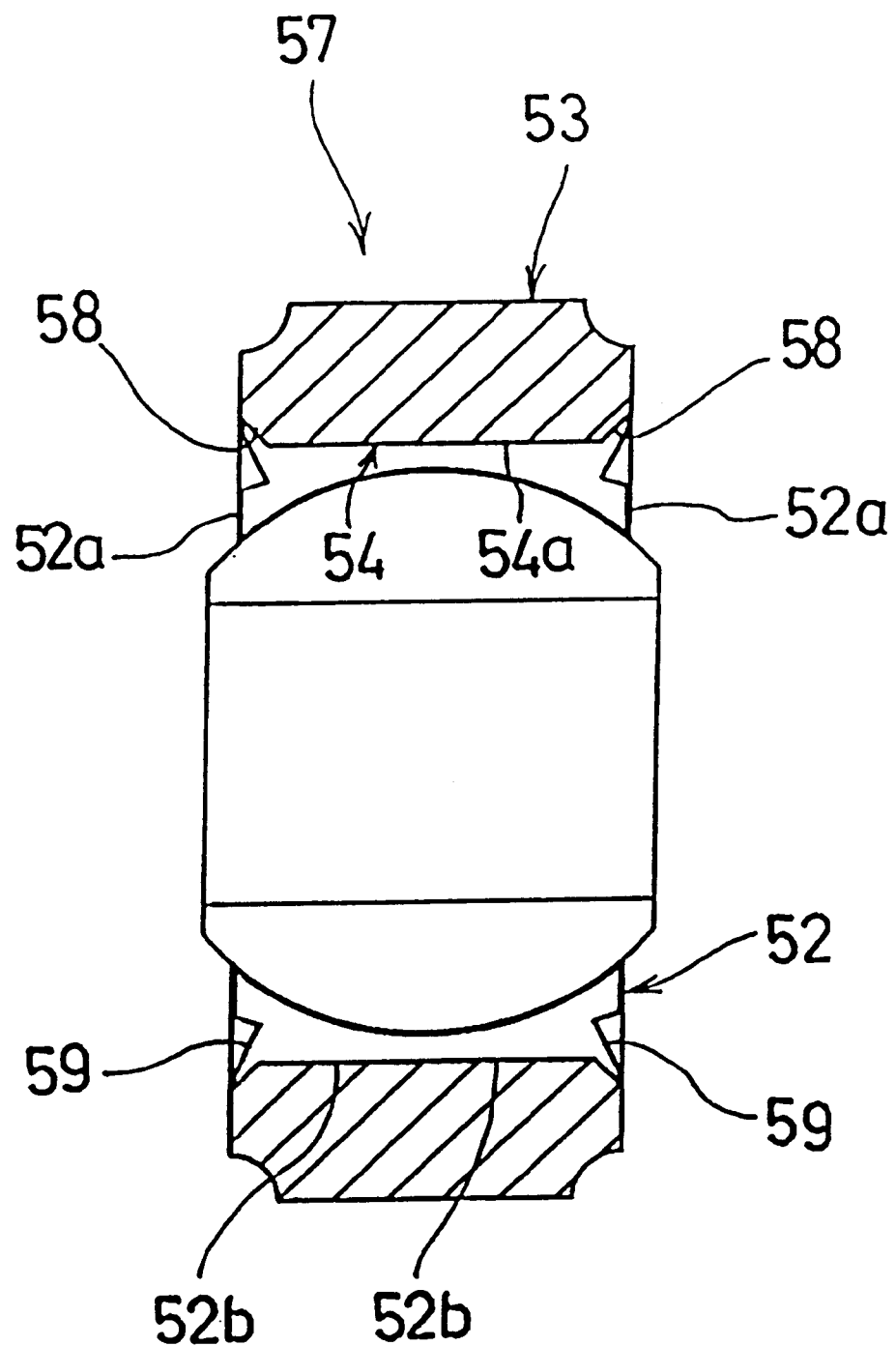
FIG. 12 is a sectional view showing another conventional manner (staking).

Next, the setscrew 6 will be explained. The setscrew 6, as shown in FIG. 1, is formed approximately cylindrical having a through hole 12 in the axial direction, and on the periphery thereof a screw 6b to be screwed in the above screw portions 3 is formed, and by being screwed in the screw portion 3 and tightened, the through hole 12 is retained with the stepped portion 5 of the outer race 4 and the front end face 6a of the setscrew 6 abuts to the end face 5a of the stepped portion 5, thereby the front end face 6a of the setscrew 6 is structured to press the end face 5a of the stepped portion 5. Further, on the inner wall surface 12a of the through hole 12, as shown in FIGS. 1 and 5, an annular groove 6d to be retained with a second snap ring 13 is formed, due to the abutting of the front end face 6a of the setscrew 6 and the end face 5a of the stepped portion 5, an end face 13a of the second snap ring 13 and an end face 4d of the outer race 4 are structured to be abutted with each other. For reference, the setscrew 6 is disposed at its rear end face 6c a plurality of recessed portions 6e (see FIG. 2), and, as shown in FIG. 6, is structured in such a manner as it is tightened by an exclusive tightening jig 14 being disposed with the projections 14a corresponding to the recessed portions 6e. And, as shown in FIG. 8, an annular projection as an abutting portion 15 is formed on the inner wall surface 12a of the through hole 12 of the setscrew 6, and by abutting an end face 15a of the abutting portion 15 to the end face 4d of the outer race 4, without using the second snap ring 13, it may be constituted to limit the outer race 4 from being displaced in the axial direction. Further, as shown in FIG. 9, it may be constituted by providing on the other end of the race retention hole 2, a hole 17 which is coaxial with the race retention hole 2 and has a diameter smaller than the race retention hole 2 and by clamping an end face 4c and 4d of the outer race 4 with the end face 17a between the race retention hole 2 and the hole 17, and the end face 15a of the abutting portion 15 of the setscrew 6, without using the snap rings 7 and 13, to position the outer race 4.

For reference, the sign 16 shown in FIG. 1 shows a rubber boots for a dust proof formed by molding where first snap ring 7 and second snap ring 13 may be molded in a unitary manner.

Under the above constitution, operations of this spherical bearing of the embodiment are explained. In this connection, hereinafter, the assembling processes of the spherical bearing of the embodiment of the present invention are explained.

(1) First, the spherical portion 9a of the inner race 9 is retained with the inner circumferential surface 4b of the outer race 4 by being pressed in etc., an assembly of the outer race 4 and the inner race 9 is formed.

(2) Next, making the outer race 4 retained with the race retention hole 2 in such a direction as the stepped portion 5 is viewed from the screw portion 3 of the housing 1, and, as shown in FIG. 1, the outer race 4 is pressed in to the position where the end face 4c of the outer race 4 abuts to the end face 7a of the first snap ring 7 to be retained with the annular groove 8 of the race retention hole 2 in the next process.

Figure 7:
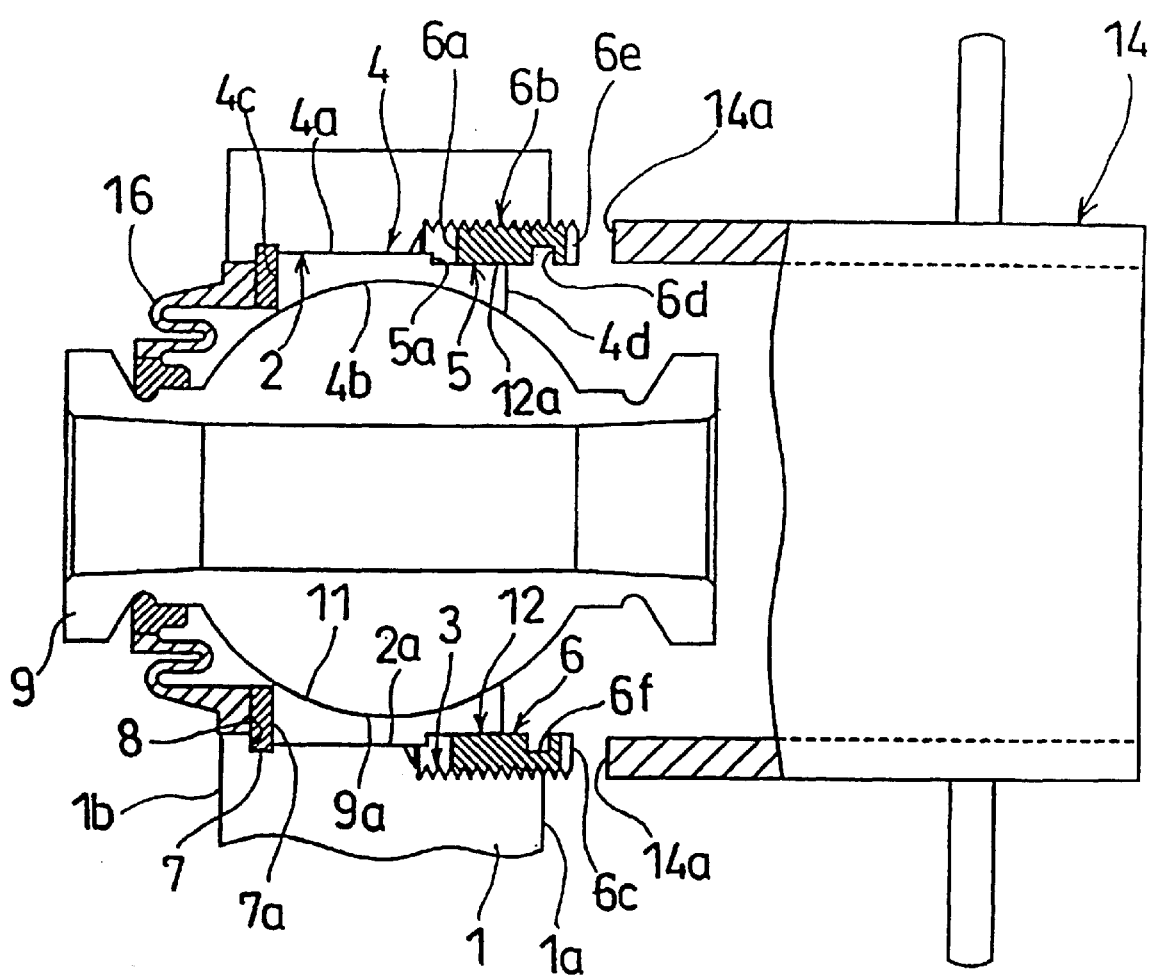
FIG. 7 is an explanation view time of tightening the setscrew of the embodiment of the present invention by the tightening jig.

(3) Next, the first snap ring 7 is retained with the annular groove 8 formed in the race retention hole 2. And, the setscrew 6 is screwed in the screw portion 3 formed on one side of the race retention hole 2 and, as shown in FIG. 7, by tightening the setscrew 6 with the exclusive tightening jig 14, as shown in FIG. 1, the through hole 12 of the setscrew 6 is retained with the stepped portion 5 of the outer race 4 and the front end face 6a of the setscrew 6 is adapted to be abutted to the end face 5a of the stepped portion 5. Thereby, as shown in FIG. 5, the front end face 6a of the setscrew 6 presses the end face 5a of the stepped portion 5, and by clamping the outer race 4 with the setscrew 6 and the first snap ring 7, the displacement of the outer race 4 in the axial direction is limited and the assembly can be retained into the housing 1 as the portion to be retained. For reference, (in the process of 2), while making the outer race 4 positioned in such a manner as the end face 4c of the outer race 4 is positioned at a position well before the position (right side in FIG. 1), where the end face 4c abuts to the end face 7a of the first snap ring 7 and by tightening the setscrew 6, by pressing the front end face 6a of the setscrew 6 to the end face 4c of the outer race 4 and making the periphery 4a of the outer race 4 slid to the inner wall surface 2a of the race retention hole 2, it may make the end face 4c of the outer race 4 abutted to the end face 7a of the first snap ring 7.

Figure 2:
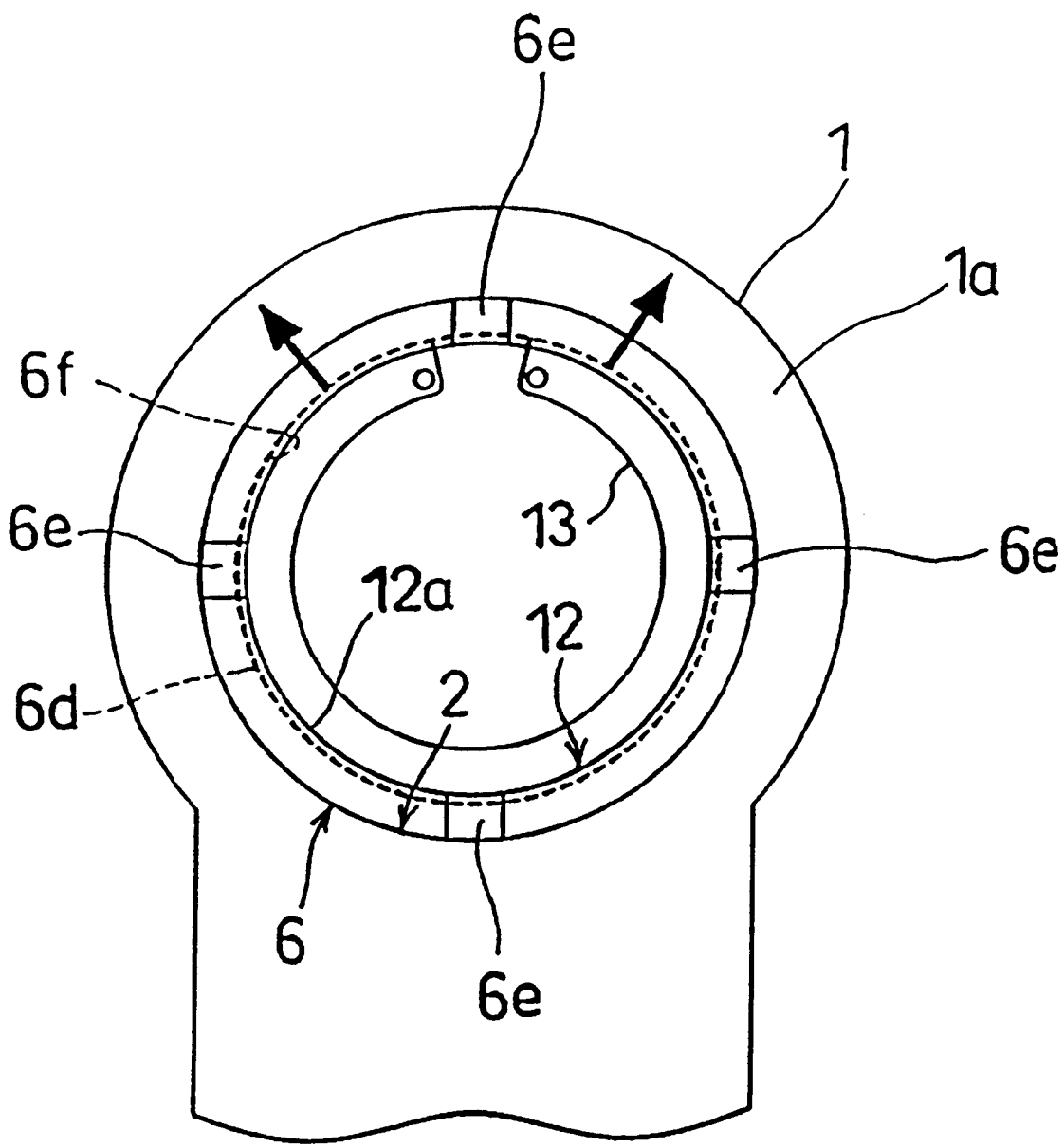
FIG. 2 is a front view of the embodiment of the spherical bearing of the present invention.

(4) After tightening the setscrew 6, as shown in FIGS. 1 and 2, the second snap ring 13 is retained with the annular groove 6d formed on the inner wall surface 12a of the through hole 12 of the setscrew 6. Here, by employing the high tensile snap ring as the second snap ring 13, as shown in FIG. 2, since a force in a radial direction of the through hole 12 is applied on the bottom surface 6f of the annular groove of the setscrew 6, the contact surface pressure between the screw 6b of the setscrew 6 and the screw portion 3 of the housing is increased, and the loosening of the setscrew 6 can be prevented. Further, by abutting the end face 13a of the second snap ring 13 to the end face 4d of the outer race 4, the displacement of the outer race 4 in the axial direction is limited more securely.

For reference, in order to prevent the setscrew 6 from being loosened more securely, although there are various methods such as; to apply a loosening preventing agent on the screw 6b of the setscrew 6, to stick together by press working after tightening the setscrew 6, to fix the setscrew 6 by a pushing force of the tip end of a setscrew which is screwed in a hole provided in advance through the periphery of the housing 1 and the retention hole 2 and tightened, to insert a key member in a key groove provided in common with the setscrew 6 and the housing 1 in the axial direction after tightening the setscrew 6, and to press in a pin, after tightening the screw 6, into a hole machine-worked from the periphery surface of the housing 1 toward the axis, it is free to select either one of them if it is in accordance with the object to prevent the tightened setscrew 6 from being loosened.

Further, as shown in FIG. 8, on the inner wall surface 12a of the through hole 12 of the setscrew 6, an annular projection as a portion 15 to be abutted is formed, by abutting the end face 15a of the portion 15 to be abutted to the end face 4d of the outer race 4, without using the second snap ring 13, the displacement of the outer race 4 in the axial direction can be limited.

Accordingly, in the retention method of the spherical bearing of the embodiment, the first snap ring 7 is retained with the retaining groove 8 formed on the other side of the race retention hole 2 of the housing 1 and the setscrew 6 is screwed in the screw portion 3 provided on one side of the race retention hole 2 and tightened. Thereby, the front end face 6a of the setscrew 6 presses the end face 5a of the stepped portion 5 of the outer race 4, and by clamping the outer race 4 with the first snap ring 7 and the setscrew 6 and making the gap between the first snap ring 7, the setscrew 6 and the outer race 4 null, since the outer race 4 is retained to the housing 1 as the portion to be retained, the displacement of the outer race 4 in the axial direction can be securely limited. Accordingly, even if an axial load is applied on the bearing, the end faces 4c and 4d of the outer race 4 are not threatened to hit the snap ring and further even if such a spherical bearing is employed in a drive system of vehicles, there is no anxiety that vibrations are transmitted in the vehicle interior to generate unpleasant noises. Further, as shown in FIG. 5, since the front end face 6a of the setscrew 6 presses the end face 5a of the stepped portion of the outer race 4, the inner circumference surface 4b of the outer race 4 is not threatened to be deformed to change the transmission torque of the spherical bearing, thereby a stable torque transmission characteristic is effected. In addition, since merely by adding the setscrew 6, and by applying any additional working to the conventional parts, those can be used, due to the simple structure the manufacturing cost is controlled.

Further, since the annular groove 6d is formed on the inner wall surface 12a of the through hole 12 of the setscrew 6 and the second snap ring 13 is retained with that groove 6d, in particular, by constituting the setscrew with soft metal such as aluminum and retaining the second snap ring 13 made of a metal of high tension with the annular groove 6d of the setscrew 6, against the annular groove bottom 6f of the setscrew 6 a force in the radial direction of the through hole 12 is applied and the setscrew 6 is expanded, thereby the contact surface pressure between the screw 6b and the screw portion 3 is increased to prevent the setscrew 6 from being loosened. Further, by abutting the end face 13a of the second snap ring 13 against the end face 5a of the outer race 4, the displacement of the outer race 4 in the axial direction can be more securely controlled. For reference, as shown in FIG. 8, the annular projection as the portion 15 to be abutted is formed on the inner wall surface 6a of the through hole 12 of the setscrew 6, and by abutting the end face 15a of the portion 15 to be abutted to the end face 4d of the outer race 4, the second snap ring 13 can be omitted to simplify the part assembling processes.

According to the first aspect of the present invention, the first snap ring is retained with the annular groove formed on the other side of the race retention hole, the setscrew 6 is screwed in the screw portion 3 formed on one side of the race retention hole and tightened, the end face of the stepped portion of the outer race is pressed by the front end face of the setscrew, the outer race is clamped with the first snap ring and the setscrew to make the gap between the first snap ring, the setscrew and the outer race null and the outer race is retained to the portion to be retained, the displacement of the outer race in the axial direction is securely limited, and even if the axial load is applied on the bearing, the end face of the outer race is not threatened to hit the snap ring, and even if such a spherical bearing is employed in the steering driving system of vehicles, there is no anxiety that the vibrations are transmitted and unpleasant noises are generated in the vehicle interior. And, since the front end face of the setscrew presses the end face of the stepped portion of the outer race, the inner circumferential surface of the outer race is not threatened to be deformed to change the transmission torque of the spherical bearing, thereby a stable torque transmission characteristic is effected. In addition, since merely by adding the setscrew 6, and by applying any additional working to the conventional parts, those can be used in common, due to the simple structure the manufacturing cost is controlled.

And, according to the second aspect of the present invention, since the annular groove is formed on the inner wall surface of the through hole of the setscrew, with which the second snap ring is retained, and in particular, the setscrew is formed with a soft metal such as aluminum and with the annular groove the second snap ring of high tensile is retained, so that to the bottom of the annular groove a force in the radial direction of the through hole is acted and the setscrew is expanded to increase the contact surface pressure between the screw of the setscrew and the screw portion to prevent the setscrew from being loosened. Further, by abutting the end face of the second snap ring to the end face of the outer race, the displacement of the outer race in the axial direction is more effectively controlled.

In addition, according to the third aspect of the present invention, by forming the annular projection as the portion to be abutted on the inner wall surface of the through hole of the setscrew and abutting the end face of the portion to be abutted to the end face of the outer race, the second snap ring is omitted to simplify the parts assembling processes.

What is claimed is:

1. A retention method for a spherical bearing, the spherical bearing comprising an outer race and an inner race wherein a spherical surface of the spherical bearing is supported in the outer race rotatably and slidably and the outer race is retained in a race retention hole formed in a housing, the retention method comprising the steps of:

forming, in the housing on an inner wall surface of a first side of the race retention hole, a screw portion having a given stroke coaxially with the race retention hole;

forming, on a second side of the inner wall surface of the race retention hole, an annular groove to be retained with a snap ring;

forming, on one side of a periphery of the outer race, a stepped portion having a diameter smaller than the periphery of the outer race;

retaining a first snap ring, while retaining the outer race of the spherical bearing in the race retention hole, in the annular groove; and pressing an end face of the stepped portion with an end face of a setscrew toward the first snap ring by screwing and tightening the setscrew formed with a through hole in an axial direction in the screw portion, wherein the spherical bearing is retained to the housing by clamping the outer race with the first snap ring and the setscrew.

2. The retention method for the spherical bearing according to claim 1, wherein an annular groove is formed on an inner wall surface of the through hole of the setscrew and, in the annular groove, a second snap ring is retained.

3. The retention method for the spherical bearing according to claim 1, whereon on an inner wall surface of the through hole of the setscrew, a portion to be abutted by an end of the outer race is formed.

* * * * *

UNITED STATES PATENT AND TRADEMARK OFFICE
CERTIFICATE OF CORRECTION

PATENT NO. : 6,349,470 B1
DATED : February 26, 2002
INVENTOR(S) : Gen Sasaki et al.

It is certified that error appears in the above-identified patent and that said Letters Patent is hereby corrected as shown below:

<u>Title page,</u>
Item [56], correct to read as follows:
-- References Cited
U.S. PATENT DOCUMENTS

| | | | |
|---|---|---|---|
| 3,014,767 A | 12/1961 | Thrasher et al. | |
| 3,754,802 A * | 8/1973 | Keller | 308/72 |
| 3,947,077 A | 3/1976 | Berg et al. | |
| 4,355,250 A * | 10/1982 | Langdon | 310/88 |
| 4,716,327 A * | 12/1987 | Stone | 310/90 |
| 4,806,025 A * | 2/1989 | Kamiyama et al. | 384/202 |
| 4,887,916 A * | 12/1989 | Adam et al. | 384/192 |
| 5,113,104 A * | 5/1992 | Blaettner et al. | 310/90 |
| 5,358,342 A * | 10/1994 | Frisbee et al. | 384/213 |
| 5,483,756 A * | 1/1996 | Heyder | 34/601 |
| 5,718,517 A | 2/1998 | Morando | |
| 5,945,756 A * | 8/1999 | Periyathamby et al. | 310/89 -- |

Signed and Sealed this

Tenth Day of September, 2002

*Attest:*

JAMES E. ROGAN
*Attesting Officer*    *Director of the United States Patent and Trademark Office*